United States Patent [19]
Fukushima

[11] Patent Number: 5,694,166
[45] Date of Patent: Dec. 2, 1997

[54] VIDEO CAMERA WITH SLOWER THAN STANDARD READ-OUT FROM CCD

[75] Inventor: Nobuo Fukushima, Yokohama, Japan

[73] Assignee: Canon Kabushiki Kaisha, Tokyo, Japan

[21] Appl. No.: 260,036

[22] Filed: Jun. 15, 1994

Related U.S. Application Data

[63] Continuation of Ser. No. 935,824, Aug. 26, 1992, abandoned.

[30] Foreign Application Priority Data

Sep. 4, 1991 [JP] Japan ................... 3-223832

[51] Int. Cl.⁶ .................. H04N 5/76; H04N 9/64
[52] U.S. Cl. .................. 348/231; 348/715; 348/718
[58] Field of Search .................. 348/714, 715, 348/718, 233, 231; 358/134; 395/250; H04N 5/76, 9/64

[56] References Cited

U.S. PATENT DOCUMENTS 5,134,487  7/1992  Taguchi et al. ............... 358/209
5,195,182  3/1993  Sasson ............... 348/714

FOREIGN PATENT DOCUMENTS 1379528  3/1973  United Kingdom ............... H04N 7/10

Primary Examiner—John K. Peng
Assistant Examiner—John W. Miller
Attorney, Agent, or Firm—Robin, Blecker, Daley and Driscoll

[57] ABSTRACT

A video camera comprises a solid state image pickup device, a pulse generator to supply a transfer pulse to read out signals of the solid state image pickup device, A/D converters to convert the signals read out from the solid state image pickup device into the digital signals, and a dynamic RAM which operates in the high speed page mode to store the digital signals. The video camera has a reading circuit in which the time which is required to read out at least one line of the solid state image pickup device is shorter than the maximum permission time to write into the same RAS address in the high speed page mode and the period of the transfer pulse is integer times as long as the period of the original oscillation clock of the pulse generator.

5 Claims, 4 Drawing Sheets

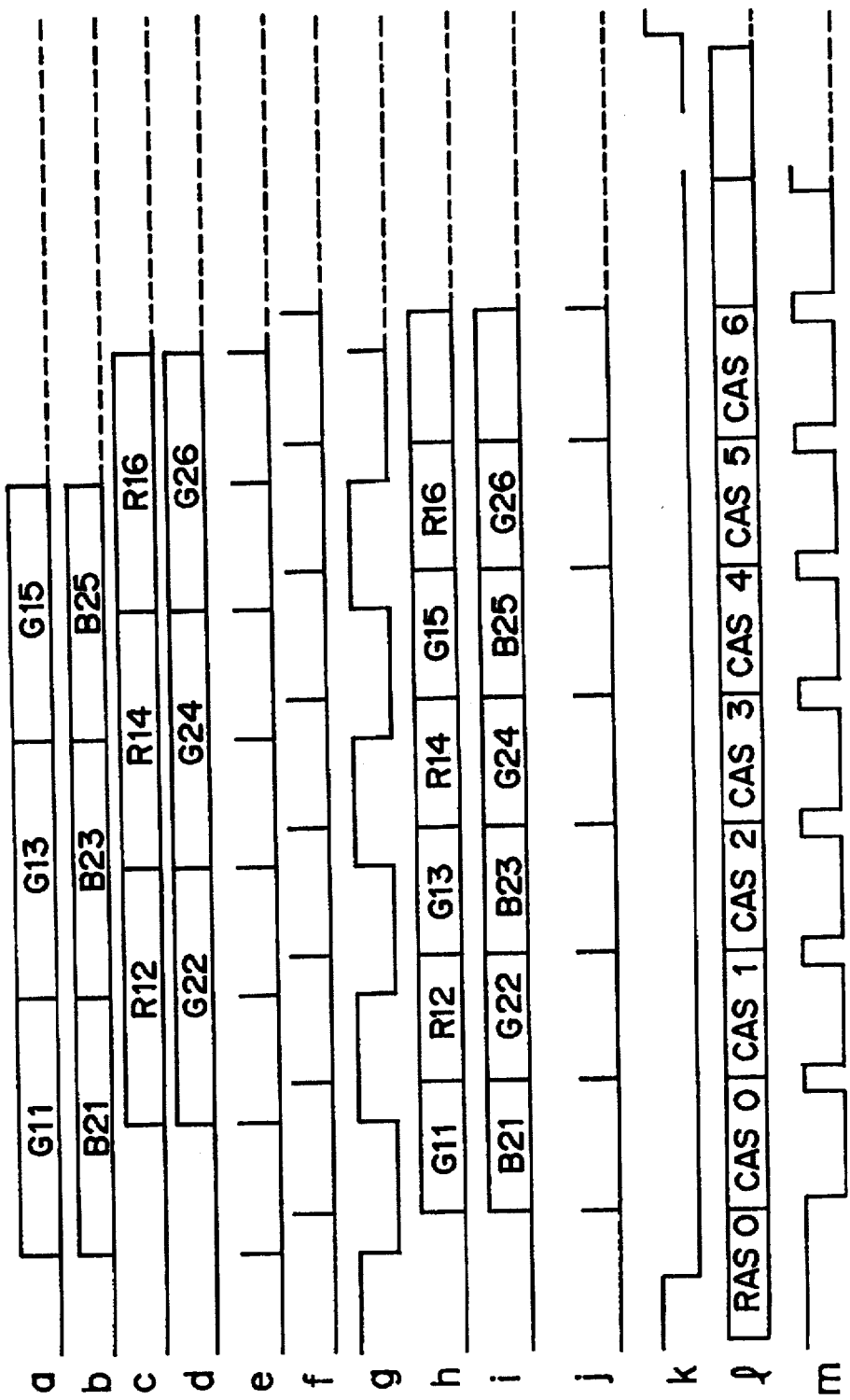

VIDEO CAMERA WITH SLOWER THAN STANDARD READ-OUT FROM CCD

This is a continuation application under 37 CFR 1.62 of prior application Ser. No. 07/935,824, filed Aug. 26, 1992 now abandoned.

BACKGROUND OF THE INVENTION

1. Field of the Invention

The invention relates to a video camera having a memory for temporarily storing data of a solid state image pickup device such as a CCD or the like.

2. Related Background Art

First, the timing to drive an ordinary solid state image pickup device such as a CCD or the like is shown. FIGS. 1 and 2 show only the portions necessary for explanation. In FIG. 1, reference numeral 101 denotes a CCD having stripe color filters of R, G, and B; 102 a sample and hold circuit; and 103 a timing signal generating circuit. In FIG. 2, a denotes outputs R, G, and B of the CCD; b indicates a sampling and holding pulse which is generated from the timing signal generating circuit 103; and c indicates output signals r, g, and b after completion of the sampling and holding processes.

Hitherto, the pixel signal of one field of the solid state image pickup device 101 is read out at a period of one field of the standard system of the television. The number of pixels of the solid state image pickup device is being increased in recent years and the number of transfer pixels per one horizontal line is being increased.

When the number of transfer pixels increases, the transfer time per pixel decreases, a defective transfer occurs, the time width of an output signal per pixel of the image pickup device 101 is too short, a timing precision of the sampling and holding process becomes severe, or an A/D converter which operates at a high speed is needed in the case where the signal of the image pickup device 101 is A/D converted into the digital signal or the like.

Due to such causes, a yield of the solid state image pickup device is eventually deteriorated or peripheral circuits of the solid state image pickup device become complicated.

On the other hand, if the image signal is read out too slowly than it is needed, when the signal of the solid state image pickup device is stored into the memory, the transfer time increases. There is an inconvenience such that a continuous photographing speed becomes slow or the like in the camera.

SUMMARY OF THE INVENTION

The invention is made in consideration of such circumstances and in a video camera to store data of a solid state image pickup device into a dynamic RAM (hereinafter, referred to as a DRAM), it is an object of the invention to provide a video camera which can set a signal reading speed of the solid state image pickup device to be slower than an ordinary television rate while matching with that of a dynamic RAM.

To accomplish the above object, according to an embodiment of the invention, a video camera is constructed as follows.

That is, there is provided a video camera comprising a solid state image pickup device; a pulse generator to supply a transfer pulse to read out a signal of the solid state image pickup device; an A/D converter to convert the signal read out from the solid state image pickup device into the digital signal; and a dynamic RAM which operates in a high speed page mode to store the digital signal, wherein the video camera further has reading means in which a time that is required to read out at least one line of the solid state image pickup device is shorter than the maximum permission time to write into the same RAS address in the high speed page mode and a period of the transfer pulse is integer times as long as a period of an original oscillating clock of the pulse generator.

The reading means is constructed in a manner such that the time which is required to read out at least one line of the solid state image pickup device is longer than the horizontal synchronizing period of the standard system of the television.

By the above construction, at least one line of the solid state image pickup device is read out within the maximum permission time to write into the same RAS (raw address strobe) in the high speed page mode of the dynamic RAM. Therefore, by making the reading operation of the solid state image pickup device and the storing operation of the memory correspond to each other, the reading operation of the device can be made slow without obstructing the operation of the memory.

The above and other objects and features of the present invention will become apparent from the following detailed description and the appended claims with reference to the accompanying drawings.

BRIEF DESCRIPTION OF THE DRAWINGS

FIG. 6 is a timing chart of the embodiment.

DETAILED DESCRIPTION OF THE PREFERRED EMBODIMENTS

An embodiment of the invention will be described in detail hereinbelow.

Figure 1:
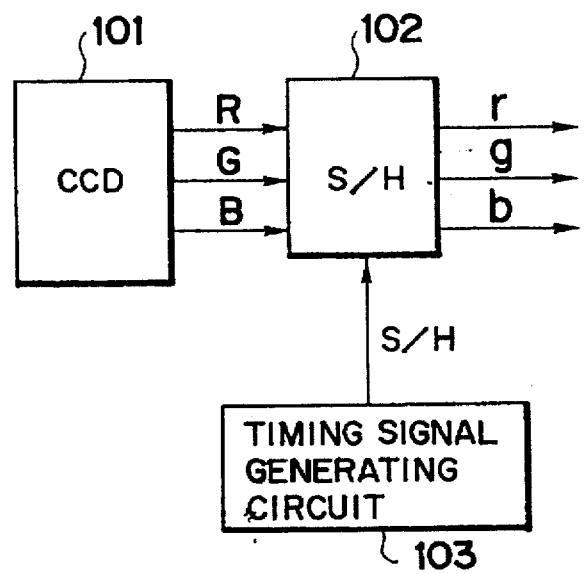
FIG. 1 is a block diagram of a main section of a conventional example.
Figure 2:
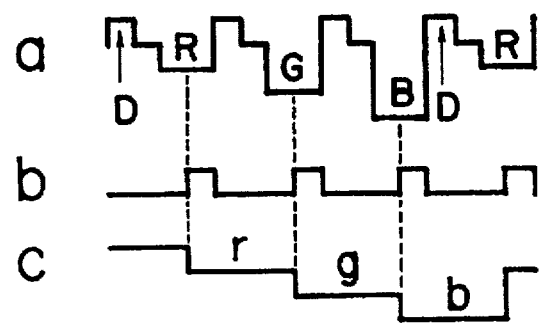
FIG. 2 is an explanatory diagram of the conventional example.
Figure 3:
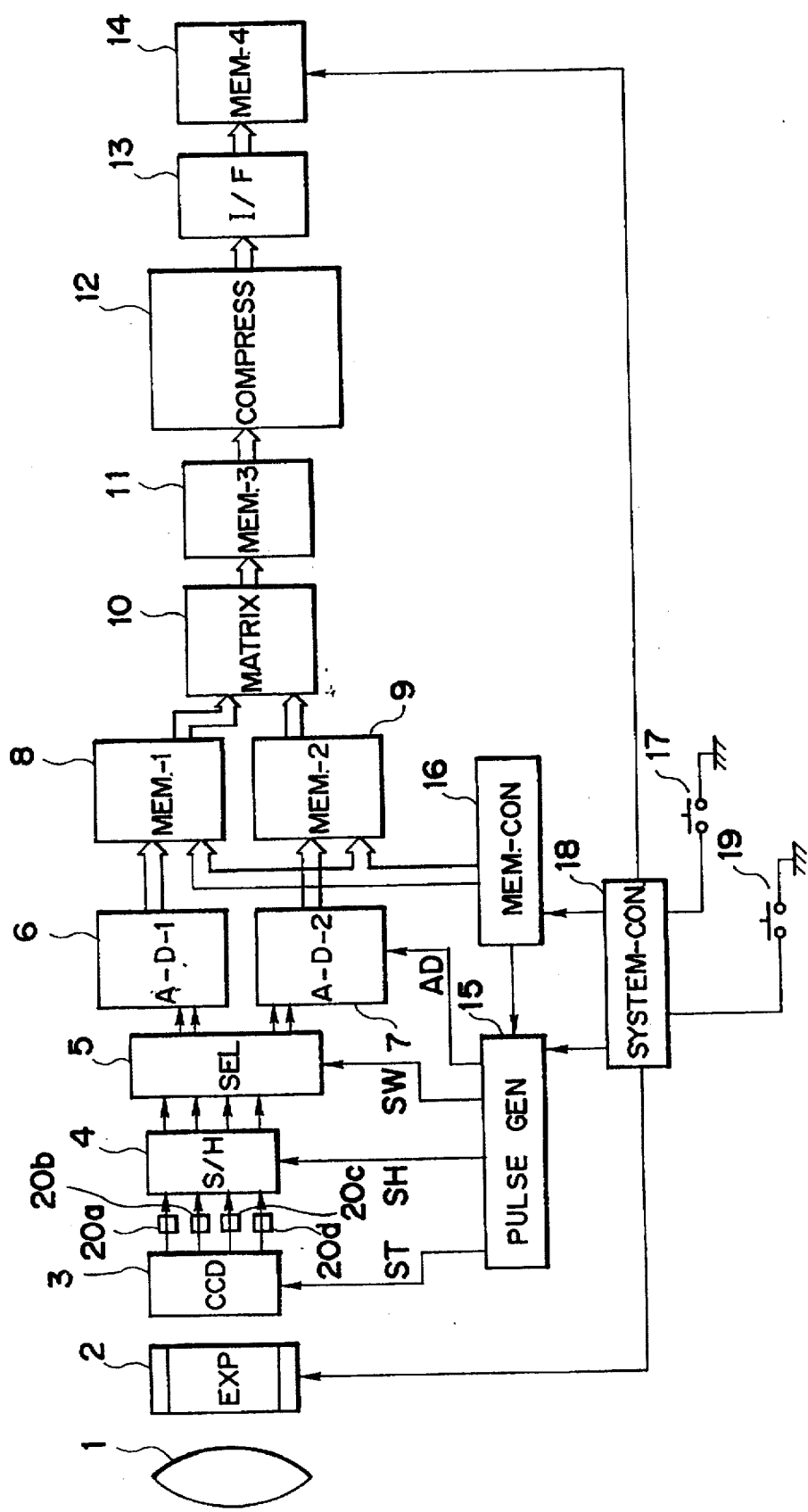
FIG. 3 is a block diagram of an embodiment of the invention.

FIG. 3 is a block diagram of an "electronic still camera" according to the embodiment. In the diagram, reference numeral 1 denotes an image pickup lens; 2 a light amount control member such as diaphragm, shutter, or the like; 3 a solid state image pickup device such as a CCD; 20a, 20b, 20c, and 20d level adjusting means for clamping predetermined portions of output signals from the CCD 3 (for instance, portions of D in the blanking portions (FIG. 2) of the output signals) and for adjusting the output levels of the output lines; 4 a pre-processing circuit to execute the sampling and holding process, γ (gamma) correction, and knee correction; 5 a switching circuit to selectively supply output signals of the pre-processing circuit to A/D converters at the next stage; 6 a first A/D converting circuit; 7 a second A/D converting circuit; 8 a first memory (DRAM); 9 a second memory (DRAM); 10 a matrix circuit to form a luminance signal and color difference signals; 11 a third memory to store the luminance signal and the color difference signals; 12 a data compressing circuit; 13 an interface circuit with a fourth memory medium 14, which will be explained hereinlater; 14 the memory medium such as a hard disk or the like (a memory medium such as memory card, optical disc, or the like can be also used); 15 a pulse signal generator to generate a timing signal to actuate the solid state image pickup device, a sampling and holding pulse, and an A/D conversion pulse; 16 a memory controller to control the reading/writing operations of the memory and the refreshing operation of the DRAM; 17 a recording trigger switch; 18 a system controller to control the system such as a photographing sequence or the like; and a mode selecting switch 19.

The operation of the embodiment will now be described with reference to FIGS. 4 to 6.

Figure 4:
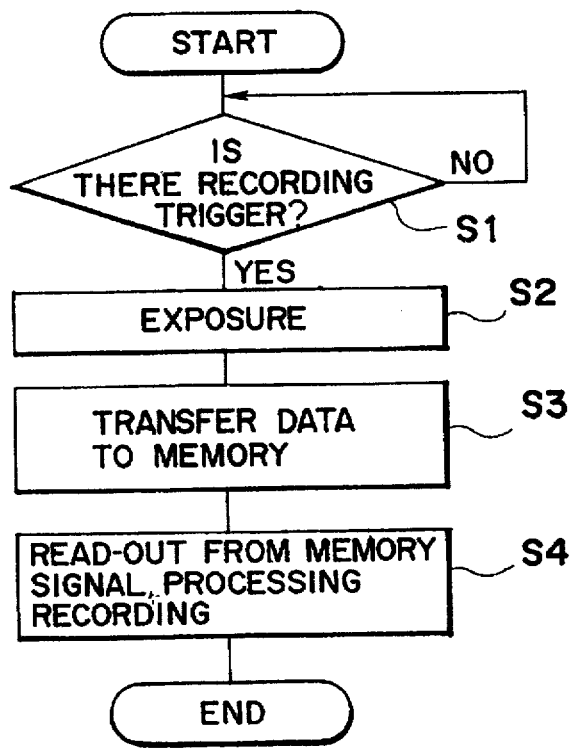
FIG. 4 is a flowchart showing the operation of the embodiment.

FIG. 4 is a flowchart showing the photographing operation of the embodiment. First, in step S1, a check is made to see if the recording trigger switch 17 has been depressed or not. If YES, the processing routine advances to the photographing operation (step S2 and subsequent steps). In step S2, the exposure of the solid state image pickup device 3 is performed by controlling the light amount control member 2 such as shutter, diaphragm, or the like. In step S3, the memory controller 16 is controlled and the signal accumulated in the image pickup device 3 is transferred into the memories 8 and 9. In step S4, the memory controller 16 is again controlled and the data in the memories 8 and 9 is transferred to the matrix circuit 10. After that, the data is preserved on the hard disc 14 through the memory 11, compressing circuit 12, and interface 13. The fundamental photographing operation is finished in this manner.

The operation to write the signal in the image pickup device 3 into the memories (DRAMs) 8 and 9 will now be described with reference to FIGS. 5 and 6.

Figure 5:
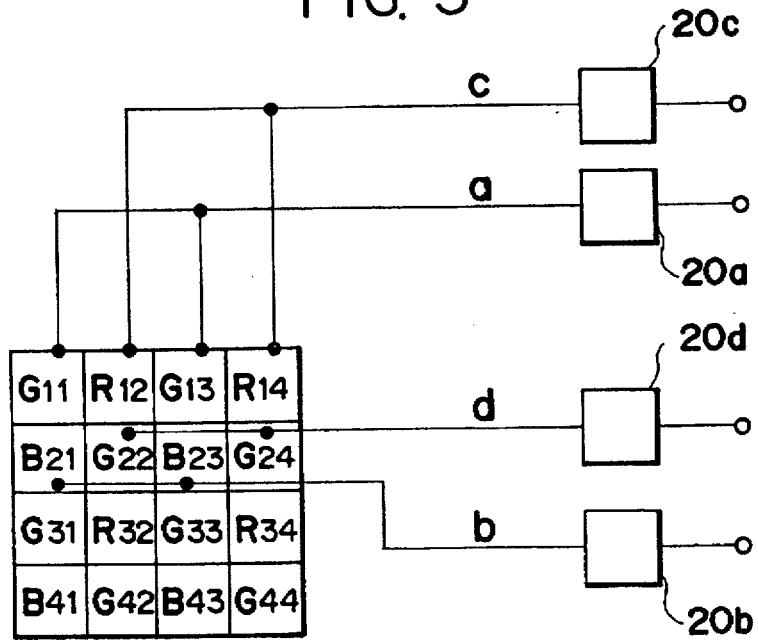
FIG. 5 is a diagram showing a pixel arrangement of a solid state image pickup device of the embodiment.

First, FIG. 5 is a pixel arrangement diagram of the solid state image pickup device 3. In the diagram, R, G, and B indicate colors of the color filters of the pixels, respectively. Each reference numeral indicates the position on the two-dimensional plane of each pixel. For instance, $R_{12}$ denotes the pixel locating at the position of "the first row and the second column". A connecting relation between each pixel and the output line is set such that, as shown in FIG. 5, each color (R, G, B) corresponds to each output line and, with respect to the G signal, the G signals ($G_{1n}$, $G_{3n}$, ...) of the odd-number rows and the G signals ($G_{2n}$, $G_{4n}$, ...) of the even-number rows are generated through individual output lines, respectively.

The level adjusting means (20a, 20b, 20c, 20d) clamp or amplify predetermined positions of the output signals to predetermined levels, thereby enabling a variation among the output lines to be prevented.

FIG. 6 is a diagram for explaining the timings from the reading operations of the signals from the solid state image pickup device 3 to the recording operations into the memories 8 and 9. In the diagram, reference characters a, b, c, and d denote outputs of the image pickup device 3 (refer to FIG. 5). e indicates a transfer pulse to read out the signal from the image pickup device 3; f a sampling and holding pulse; g a switching pulse for switching four sampling and holding outputs and supplying to the two A/D converters 6 and 7; h and i input data which are supplied from the switching circuit 5 to the A/D converters 6 and 7; R, G, and B data of each pixel which have been read out at a, b, c, and d; and j an A/D conversion pulse. The A/D conversion is executed synchronously with the A/D conversion pulse j. k indicates an RAS (row address strobe) signal to the memories 8 and 9; l an RAS/CAS (column address strobe) address data signal to the memories 8 and 9; and m a CAS signal to the memories 8 and 9.

A high speed page mode of the DRAM will now be briefly explained.

In the high speed page mode, a WE (write enable) signal is set to the low level while maintaining the RAS signal at the low level and the writing operation is executed by the operation of only the CAS signal. That is, one word is selected by the RAS address. When the CAS address is designated, the data in the designated address is first written. After that, the data of one word is successively written by changing only the CAS address (the input data is obviously changed) without designating the RAS address.

The details of the timings and the like have been clarified in the data book or the like of each manufacturing company regarding the memory. Therefore, their descriptions are omitted here. The invention relates to a point that the effective time of the RAS address when the data is successively written is limited in use (for example, within 100 microseconds).

According to the invention, the reading operation of the signal of one horizontal line of the solid state image pickup device and the writing operations into the memories 8 and 9 are finished within such a limited time.

Therefore, when the signal of the image pickup device 3 is read out, the RAS address is first designated in the horizontal blanking period in the television rate of the standard system. After that, the reading operation of the signal of the image pickup device 3 is started. The CAS address and write pulse are generated from the pulse generator 15 and memory controller 16 synchronously with the reading operation.

In the embodiment, the number of horizontal pixels is set to 1024. Now, assuming that the limit time of the high speed page mode mentioned above, namely, the maximum permission time is set to 100 microseconds, the maximum transfer time which is required per pixel is equal to about 97.6 nanoseconds.

100÷1024≈0.09766 microsecond

Now, assuming that an original oscillation clock frequency of the pulse generator 15 is equal to 50 MHz, the time which is integer times as long as the clock period (20 nanoseconds) is selected as an actual transfer clock period of the solid state image pickup device, so that it is set to 80 nanoseconds.

In the embodiment, namely, the transfer pulse period to read out the signal from the image pickup device 3 corresponds to the period of the pulse e in FIG. 6 and is equal to 80 nanoseconds. Therefore, the periods of the signals l and m are also set to 80 nanoseconds.

By the above operations, the signal of the image pickup device 3 is read out and A/D converted and the transfer speeds to the memories 8 and 9 can be matched with the writing speed in the high speed page mode of the DRAM.

Although the embodiment has been described with respect to the electronic still camera, the invention is not limited to such a camera but can be also applied to other video cameras within an allowable range of the processing time.

Although the embodiment has been described on the assumption that the number of horizontal pixels of the solid state image pickup device is equal to the number of bits of one word of the memory, the number of horizontal pixels can be also set to an arbitrary value so long as it is equal to or less than the number of bits of one word of the memory.

Although two horizontal lines of the solid state image pickup device have simultaneously been read out in the embodiment, it depends on a reading structure of the solid state image pickup device and the image signal can be also read out every horizontal line.

Further, although two sets of A/D converters 6 and 7 and memories 8 and 9 have been provided in the embodiment, the invention can be also constructed by using one A/D converter and one memory or by using three or more A/D converters and three or more memories in consideration of the object, costs, size, and the like of the system.

Although the pure color filters have been used as color filters in the above embodiment, the color filters of the complementary colors (Ye, Cy, G, Ma) can be also used in place of the pure colors.

On the other hand, since the memory 11 has been provided at the post stage of the matrix circuit 10 in the above embodiment, the time which is required to perform the signal processes at the post stage or to store onto the hard disc can be made slow.

In the above embodiment, further, the outputs of the A/D converters 6 and 7 are stored into the two memories 8 and 9. For instance, the signal of the first field in the output from the CCD 3 can be stored into the first memory 8 and the signal of the second field which has been interlaced with the first field can be stored into the second memory 9. Due to this, the signal of two fields which have been interlaced can be obtained by one exposure.

In such a case, the CCD 3 needs to obtain the signal of at least one frame. In this instance, the operation of the switching circuit 5 is set in accordance with the operation of a mode selecting switch 19.

Since the outputs of the CCD 3 have been A/D converted and stored into the memories 8 and 9 without executing a correlating process in the above embodiment, the signals stored in the memories 8 and 9 can be preserved in a state in which a degree of freedom of the processes at the post stage is remained.

Although the CCD has been used as an image pickup device in the above embodiment, a non-destructive device such as a Basis or the like can be also used. In such a case, since the signal can be read out from each pixel a plurality of number of times, when the signal of one frame is obtained by the single exposure and is read out over two fields, it is sufficient to use the small number of pixels. The chip size of the device can be reduced and the apparatus can be miniaturized.

According to the embodiment as described above, the reading speed of the solid state image pickup device can be set to be slower than the ordinary television rate within a range such as not to increase the data transfer time into the memory uselessly. Therefore, an allowable range of the reading transfer speeds of the solid state image pickup device can be widened. The improvement of the yield of the solid state image pickup device can be eventually expected.

It is also sufficient to use the circuits of relatively slow processing speeds as peripheral circuits such as A/D converters and the like around the solid state image pickup device or the like. The costs and electric power consumption of the whole camera can be also reduced.

What is claimed is:

1. A video camera comprising:

a solid state image pickup device;

an A/D converter to convert a signal read out from said solid state image pickup device into a digital signal;

a pulse generator to generate a transfer pulse to read out an image pickup signal from said solid state image pickup device and transfer the read-out image pickup signal to said A/D converter;

a dynamic RAM which operates in a page mode and is used to store the digital signal; and control means for controlling said pulse generator and said dynamic RAM according to the page mode operation of said dynamic RAM to generate the transfer pulse having a period which is shorter than a maximum permission time for writing into a same RAS address in the page mode.

2. A video camera according to claim 1, wherein in said control means, the time which is required to read out at least one line of the solid state image pickup device is longer than a horizontal sync period of a standard system of a television.

3. A video camera according to claim 1, wherein the generated transfer pulse has a period which is integer times as long as a period of an original oscillation clock of said pulse generator.

4. A video apparatus comprising:

a video source for producing a digital video signal;

a dynamic RAM having a page mode for storing said digital video signal; and control means for controlling said video source and said dynamic RAM according to the page mode of said dynamic RAM so that the digital video signal of each line is read out from said video source in a longer period than a horizontal sync period of a standard TV system and written into said dynamic RAM within the effective time of a RAS address in said page mode.

5. An apparatus according to claim 4, wherein a line period for supplying each digital video signal from said video source is shorter than a maximum permission time to write into a RAS address in said page mode.

* * * * *